2,844,552

STABILIZATION OF MIXTURES OF POLYAMIDE, EPOXY RESIN SOLUTIONS WITH FORMIC ACID

David Glaser, St. Paul, Minn., assignor to General Mills, Inc., a corporation of Delaware No Drawing. Application February 23, 1954
Serial No. 412,095

3 Claims. (Cl. 260—18)

The present invention relates to stabilizers for mixtures of polyamide resins and epoxy resins. As disclosed in the patent application of Harold Wittcoff and Malcolm Renfrew, Ser. No. 276,054, filed March 11, 1952, entitled "Thermosetting Resinous Compositions," now Patent No. 2,705,223, polyamide resins derived from polymeric fat acids may be used to cure epoxy resins. These compositions may be prepared by mixing solutions of the respective resins and applying the mixed solution for the particular application desired. These mixed solutions, however, cure very rapidly and accordingly, it has been necessary heretofore to maintain the two solutions separate until immediately prior to use. In other words, the mixed solution of resins has a relatively short life before gelation occurs.

It has now been discovered that it is possible to produce mixed polyamide resin-epoxy resin compositions which are stable for extended periods of time without danger of curing or gelation. This stabilization of the mixed resin composition is obtained by the inclusion of formic acid in the mixture. These compositions may be caused to cure rapidly after application to produce hard infusible insoluble compositions resistant to water and various chemical materials.

It is, therefore, an object of the present invention to provide a process of stabilizing mixtures of polyamide resins and epoxy resins to prevent the premature gelation or curing of the same. It is another object of the present invention to provide stabilized compositions comprising mixtures of polyamide resins and epoxy resins.

The present invention is applicable to epoxy resins in general. These epoxy resins are complex polymeric reaction products of polyhydric phenols with polyfunctional halohydrins such as epichlorhydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups or terminal epoxy groups and terminal primary hydroxyl groups. In the complex reaction mixture the terminal epoxy groups are generally in excess of the terminal primary hydroxyl groups. Typical polyhydric phenols include resorcinol, and various bisphenols resulting from the condensation of phenol with aldehydes and ketones such as formaldehyde, acetaldehyde, acetone, methyl ethyl ketone, and the like. Resins of this type are disclosed in Greenlee Patent 2,585,115 and these resins are useful in the present invention.

The molecular weight of the epoxy resins may be controlled by the relative proportions of the reactants, as well as by the extent to which the reaction is carried on. The present invention involving the curing of these epoxy resins may be applied to all epoxy resins. The molecular weight of the resin is not critical since both very low molecular weight resins, as well as very high molecular weight resins, can be cured by this method. The properties of the cured resin compositions may, of course, vary with the molecular weight of the epoxy resin employed, as well as the nature and molecular weight of the polyamide employed.

The polyamide compositions which may be used for curing the epoxy resins are, in general, those derived from polymeric fat acids and polyalkylene polyamines. Resins of this general type are disclosed in Cowan et al. Patent 2,450,940. Typical of these polyamides are those made with polymeric fat acids and diethylene triamine. These polyamides have a relatively high amine number due to the free amine groups. The amine number is defined as the number of milligrams of potassium hydroxide equivalent to the free amine groups present in one gram of the resin. In general, resins having amine numbers within a range of 50–250 are preferred for the present purposes.

The polymeric fat acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticica, cottonseed, corn, tall, sunflower, safflower, dehydrated castor oil and the like. In the polymerization process for the prepartion of the polymeric fat acids, the fatty acids with sufficient double bond functionality combine, for the most part probably by a Diels-Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed, whether the resultant polymer possesses residual unsaturation or not. The term "polymeric fat acids" as used herein is intended to include the polymerized mixture of acids obtained, which mixture usually contains a predominant portion of dimeric acids, a smaller quantity of trimeric and higher polymeric acids, and some residual monomer.

These polymeric fat acids may be reacted with a variety of polyalkylene polyamines, such as diethylene triamine, triethylene tetramine, dipropylene triamine, 3,3'-iminobispropylamine, etc. The amidification reaction may be carried out under the usual conditions employed for this purpose. Polyamides of this type generally have molecular weights varying from 1,000 to 10,000 and are resistant to the corrosive action of water, alkali, acids, oils, greases and organic solvents. The melting points vary, depending upon the reactants and the reaction conditions. A preferred group of these low melting polyamides are derived from polymeric fat acids and diethylene triamine and melt at from 40 to 70° C.

There is a wide variation in the relative proportions of the polyamide resin and the epoxy resin which may be employed. The polyamide resin may be considered as the curing agent for the epoxy resin when the polyamide is employed as the minor constituent. At the same time the polyamide may be employed as the major constituent with a minor amount of epoxy resin in which case it may be considered that the epoxy resin serves to cure the polyamide. Thus compositions varying from 10% epoxy resin and 90% of polyamide resin to 90% epoxy resin and 10% polyamide resin have been prepared and have desirable, though varying, properties. For example, when 10% of an epoxy resin is used with 90% of a polyamide resin derived from equimolar portions of diethylene triamine and polymeric fat acids, a cured material which is almost rubber-like in properties, is obtained. On the other hand, when 10% of the polyamide is used with 90% of the epoxy resin, a hard, highly resilient composition results. Between these extremes all other proportions are possible and the properties vary with the particular composition. The solvent resistance and mechanical resistance of all the compositions are excellent. Since the epoxy resin may vary in the content of epoxy groups and since the polyamides may vary in number of excess amine groups, it is apparent that the properties which are obtained depend upon the relative proportions of the various functional groups present. In general, the free amine groups should be present in an amount equivalent to at least one quarter of the epoxy groups. Similarly, the epoxy groups should be present in a quantity which is equivalent to at least one quarter of the free amine groups.

The resins may be mixed in the form of their solutions. The polyamides are soluble in aromatic hydrocarbons such as toluene mixed with aliphatic alcohols such as isopropanol, n-butanol and the like. The epoxy resins are soluble principally in ketone solvents and the two resins may be separately dissolved and the solutions mixed to obtain a composition which may be cured.

The stabilization of the mixed resins is obtained by the inclusion of a small amount of formic acid in the mixed composition. It is believed that the formic acid reacts with the free amine groups to form salts which render the amine groups unavailable for reaction with the epoxy groups. Upon application of the mixed composition, for example, in the form of film, the formic acid may vaporize, especially in the case of baked coatings, and thus make the amine groups available for reaction with the epoxy groups. At room temperature, curing of the mixture after application is somewhat slower than is the case at elevated temperatures encountered in baked coatings. However, even at room temperature the air-dried coatings cure and produce hard resistant films. In the case of baked coatings, the formic acid apparently vaporizes readily and these coatings cure in approximately the same period of time required for the curing of coatings which do not contain the formic acid. The properties obtained from the baked coatings are approximately the same as are obtained from baked coatings which do not include the formic acid. The high temperature employed for the baking apparently substantially completely removes the formic acid.

The quantity of formic acid employed may be varied considerably depending upon the particular type of product desired and the period of stabilization which is necessary. Even minute quantities of formic acid are effective to increase the life of the mixture. The quantity of formic acid which may be employed may vary from such a small quantity as 25% of the quantity required to neutralize all the amine groups up to the quantity which is equivalent to 100% of the free amine groups. It is also possible to employ an excess of formic acid over and above that required for complete neutralization of the free amine groups but the excess does not appear to contribute any advantages and accordingly the use of an excess is not preferred.

With the preferred polyamides, that is those derived from diethylene triamine and polymeric fat acids, it is found that the polyamides have an amine number which varies from approximately 80 to approximately 100. A quantity of formic acid, approximately 8% by weight based on the weight of the polyamide, is sufficient to neutralize all of the free amine groups and provide a slight excess. With polyamides derived from higher functional amines such as triethylene tetramine the quantity of formic acid required for complete neutralization is substantially greater.

It will be found that the viscosity of a freshly-prepared solution of the mixed polyamides containing the formic acid is appreciably higher than a freshly-prepared solution of the same resins which does not contain the formic acid. The presence of the formic acid appears to increase the initial viscosity somewhat. However, it is found that once the composition stabilized with formic acid is prepared, that there is relatively little change in viscosity over extended time periods. Thus, stabilized compositions will be found to be in an ungelled condition after even three to four months, whereas the same composition without the formic acid present may gel in a matter of one to three days.

The formic acid may be employed in any of the forms commercially available. Usually it is available in forms of 85 to 100% purity, the balance of the material being water. The formic acid may be added directly to the mixed solutions and it is found that it dissolves and forms a homogeneous mixture. The small quantity of water which may accompany the formic acid does not in any way interfere with the stabilization of the mixed resins.

Example 1

A solution of a polyamide resin, derived from polymeric fat acids and diethylene triamine having an amine number of 85 was prepared in a solvent mixture composed of xylene, n-butanol 4:1. The solution contained 50% polyamide resin by weight. A second solution was prepared from an epoxy resin (Epon 1001) in a 1:1 mixture of methyl isobutyl ketone and xylene, the solution containing 50% epoxy resin solid by weight. These two solutions were mixed in equal volumes. A control sample was taken from this mixture and also a series of samples were prepared containing varying amounts of formic acid. These samples were then stored in sealed containers and the viscosity noted over a period of time. The results are indicated in the following table:

| Sample # | Percent HCOOH by wt. | Visc. (Initial) | Viscosity after— | | | | | |
|---|---|---|---|---|---|---|---|---|
| | | | 3 days | 7 days | 11 days | 27 days | 53 days | 67 days |
| Control | 0 | J | Gelled | | | | | |
| 1 | 3.9 | T | Y-Z | | | | | |
| 2 | 5.1 | T | U | Y-Z | Y-Z | Z-4 | Gelled | |
| 3 | 6.4 | T | U-V | W | X-Y | Z1-Z2 | | |
| 4 | 8.2 | T | T-U | U-V | U-V | W-X | | Z-Z1 |
| 5 | 8.7 | T | T-U | U-V | U-V | X | | Z |
| 6 | 9.2 | S | T | T-U | U | W-X | | Y |
| 7 | 10.2 | S | T | U | U | W | | X-Y |
| 8 | 15.3 | M | N | Q-R | Q-R | U | | |

Example 2

A solution of a polyamide resin derived from polymeric fat acids and triethylene tetramine, having an amine number of 230 was prepared in a solvent mixture composed of xylene and n-butanol (4:1). The solution contained 50% polyamide resin by weight. A second solution was prepared from an epoxy resin (Epon 1001) in a 1:1 mixture of methyl isobutyl ketone and xylene, the solution containing 50% epoxy resin by weight. These two solutions were mixed in the volumes indicated in the table below so that the mixed solutions contained approximately the proportions by weight indicated. A control sample was taken of a 50:50 mixture and varying amounts of formic acid were added to the other mixtures. These samples were then stored in sealed containers and the viscosity change noted over a period of time. The results are indicated in the following table:

| Sample # | Polyamide Epoxy Resin | Percent HCOOH by wt. | Visc. (Initial) | Visc. after— | |
|---|---|---|---|---|---|
| | | | | 1 day | 5 days |
| Control | 50:50 | 0 | I | S | Gelled |
| 1 | 35:65 | 19.0 | V | W | X |
| 2 | 50:50 | 19.0 | X | X | Z |
| 3 | 65:35 | 19.0 | X-Y | Z | Z |
| 4 | 50:50 | 14.4 | X | X-Y | Z1 |
| 5 | 50:50 | 23.6 | V | W | V |

*Example 3*

The effect of formic acid on the stability of mixtures of the polyamide from Example 1 and various epoxy resins was determined in each instance. The polyamide and the epoxy resin were dissolved in the solvents indicated to prepare 50% solutions by weight. These solutions were then mixed in equal volume so that the solutions contained approximately equal quantities of polyamide resin and epoxy resin. The quantities of formic acid based on the weight of the polyamide was then added. The results are indicated in the following table:

| Sample # | Type Epoxy | Percent HCOOH by wt. | Initial Visc. | Visc. after— | |
|---|---|---|---|---|---|
| | | | | 1 day | 5 days |
| Control | CN501 | 0 | I-J | S | Gelled |
| 1 | CN501 | 9.2 | M | M | P |
| Control | Epon 864 | 0 | E | K | Gelled |
| 2 | Epon 864 | 9.2 | J | I | J |
| Control | Epon 1007 | 0 | V | Z | Gelled |
| 3 | Epon 1007 | 9.2 | Z | Z | Z |

In the above tables the percentage of formic is based on the polyamide and the viscosities are Gardner-Holdt.

I hereby claim as my invention:

1. A mixture of an epoxy resinous material containing terminal epoxy groups, and a polyamide having an amine number of at least 50 and being derived from the reaction of polymeric fat acids and a polyalkylene polyamine, the mixture being stabilized against gelation by means of formic acid varying in quantity from 25 to 100% of the quantity equivalent to the free amine groups in the polyamide resin.

2. A stabilized solution of epoxy resinous material containing terminal epoxy groups and being derived by the reaction of a bisphenol with a material selected from the group consisting of glycerol dichlorhydrin and epichlorhydrin, and a polyamide having an amine number of at least 50 and being derived from the reaction of polymeric fat acids and diethylene triamine, the solution being stabilized against gelation by means of a quantity of formic acid equivalent to from 25–100% of the free amine groups in the polyamide.

3. A stabilized solution of an epoxy resinous material containing terminal epoxy groups and a polyamide derived from the reaction of polymeric fat acids and a polyalkylene polyamine, the solution being stabilized against gelation by means of a quantity of formic acid approximately equivalent to the free amine groups in the polyamide resin.

References Cited in the file of this patent
UNITED STATES PATENTS

| | | |
|---|---|---|
| 2,707,708 | Wittcoff | May 3, 1955 |
| 2,739,140 | Price et al. | Mar. 20, 1956 |